(12) United States Patent
Komiya

(10) Patent No.: US 7,343,403 B2
(45) Date of Patent: Mar. 11, 2008

(54) NETWORK MANAGEMENT SYSTEM FOR REMOTE SETUP OF CONTROL EQUIPMENT IN A NETWORK

(75) Inventor: Noriyuki Komiya, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 733 days.

(21) Appl. No.: 10/296,704

(22) PCT Filed: Mar. 29, 2001

(86) PCT No.: PCT/JP01/02668

§ 371 (c)(1),
(2), (4) Date: Nov. 27, 2002

(87) PCT Pub. No.: WO02/080467

PCT Pub. Date: Oct. 10, 2002

(65) Prior Publication Data

US 2003/0131090 A1    Jul. 10, 2003

(51) Int. Cl.
| | |
|---|---|
| *G06F 15/173* | (2006.01) |
| *G06F 7/00* | (2006.01) |
| *G06F 17/00* | (2006.01) |
| *G06F 9/24* | (2006.01) |
| *G06F 1/24* | (2006.01) |
| *G06F 15/16* | (2006.01) |
| *G06F 17/30* | (2006.01) |
| *G06F 9/00* | (2006.01) |
| *G06F 15/177* | (2006.01) |

(52) U.S. Cl. ............... 709/223; 709/224; 709/225; 709/227; 709/228; 709/248; 709/249; 707/10; 707/104.1; 713/1; 713/2; 713/100

(58) Field of Classification Search ................ 709/203, 709/218, 223–230, 236, 248, 249; 707/10, 707/104.1; 713/1, 2, 100
See application file for complete search history.

(56) References Cited

U.S. PATENT DOCUMENTS

| | | | | |
|---|---|---|---|---|
| 5,596,723 A | * | 1/1997 | Romohr | 709/222 |
| 5,838,907 A | * | 11/1998 | Hansen | 709/220 |
| 5,926,463 A | * | 7/1999 | Ahearn et al. | 370/254 |
| 6,026,436 A | * | 2/2000 | Hawes | 709/218 |

(Continued)

FOREIGN PATENT DOCUMENTS

EP    1282275 A1 *  2/2003

(Continued)

OTHER PUBLICATIONS

Waldbusser, S. "Remote Network Monitoring Management Information Base," RFC 2819, May 2000, pp. 1-98.*

(Continued)

*Primary Examiner*—Melvin H. Pollack
(74) *Attorney, Agent, or Firm*—Buchanan Ingersoll & Rooney PC

(57) ABSTRACT

A network management system has setup processing of a target network which can be done at other network. Therefore, it is possible to perform a network setup from a remote place. The network management system includes a plurality of networks to which equipment is connected and a management node connected between the plurality of networks, for exchanging setup information on equipment between different networks through the management node.

12 Claims, 7 Drawing Sheets

U.S. PATENT DOCUMENTS

| | | | |
|---|---|---|---|
| 6,195,706 B1 * | 2/2001 | Scott | 709/245 |
| 6,279,015 B1 * | 8/2001 | Fong et al. | 715/523 |
| 6,298,349 B1 * | 10/2001 | Toyoshima et al. | 707/100 |
| 6,314,467 B1 * | 11/2001 | Hirasawa et al. | 709/236 |
| 6,360,255 B1 * | 3/2002 | McCormack et al. | 709/221 |
| 6,434,514 B1 * | 8/2002 | Chen et al. | 702/188 |
| 6,446,192 B1 * | 9/2002 | Narasimhan et al. | 712/29 |
| 6,456,892 B1 * | 9/2002 | Dara-Abrams et al. | 700/83 |
| 6,496,862 B1 * | 12/2002 | Akatsu et al. | 709/224 |
| 6,523,696 B1 * | 2/2003 | Saito et al. | 709/223 |
| 6,578,051 B1 * | 6/2003 | Mastronardi et al. | 707/104.1 |
| 6,591,306 B1 * | 7/2003 | Redlich | 709/245 |
| 6,606,304 B1 * | 8/2003 | Grinter et al. | 370/252 |
| 6,643,555 B1 * | 11/2003 | Eller et al. | 700/83 |
| 6,711,612 B1 * | 3/2004 | Blumenau et al. | 709/223 |
| 6,792,452 B1 * | 9/2004 | Philyaw | 709/217 |
| 6,801,331 B1 * | 10/2004 | Motoyama | 358/1.15 |
| 6,853,637 B1 * | 2/2005 | Norrell et al. | 370/352 |
| 6,868,397 B1 * | 3/2005 | McCaslin | 705/28 |
| 6,907,036 B1 * | 6/2005 | Malalur | 370/382 |
| 6,910,068 B2 * | 6/2005 | Zintel et al. | 709/220 |
| 6,922,722 B1 * | 7/2005 | Mann et al. | 709/220 |
| 6,963,784 B1 * | 11/2005 | Gibbs | 700/94 |
| 6,981,036 B1 * | 12/2005 | Hamada | 709/223 |
| 7,010,607 B1 * | 3/2006 | Bunton | 709/228 |
| 7,016,966 B1 * | 3/2006 | Saulpaugh et al. | 709/230 |
| 7,043,532 B1 * | 5/2006 | Humpleman et al. | 709/208 |
| 7,054,924 B1 * | 5/2006 | Harvey et al. | 709/220 |
| 7,171,670 B2 * | 1/2007 | Motoyama et al. | 719/310 |
| 2001/0049730 A1 * | 12/2001 | Brendes et al. | 709/223 |
| 2002/0120728 A1 * | 8/2002 | Braatz et al. | 709/223 |
| 2002/0143960 A1 * | 10/2002 | Goren et al. | 709/229 |

FOREIGN PATENT DOCUMENTS

| | | | |
|---|---|---|---|
| JP | 8-204736 | | 8/1996 |
| JP | 2000-74707 | | 3/2000 |
| JP | 2000-244551 | | 8/2000 |
| JP | 2000-244551 | | 9/2000 |
| JP | 2000-244551 A | | 9/2000 |
| JP | 2001014386 A | * | 1/2001 |
| JP | 2001103082 A | * | 4/2001 |

OTHER PUBLICATIONS

McCloghrie, K. and Rose, M. "Management Information Base for Network Management of TCP/IP-based Internets: MIB-II," RFC 1213, Mar. 1991, pp. 1-70.*

Chen, Wenli et al. "ANMP: ad hoc network management protocol," IEEE Journal on Selected Areas in Communication, vol. 17, Issue 8, Aug. 1999, pp. 1506-1531.*

Ramjee, Ramachandran et al. "IP-Based Access Network Infrastructure for Next-Generation Wireless Data Networks," IEEE Personal Communications, vol. 7, Issue 4, Aug. 2000, pp. 34-41.*

Japan Patent Office. Office Action issued on Aug. 23, 2005 in corresponding Japan Application No. 2002-577351. (2 pages).

Japan Patent Office. Partial English translation of the Office Action issued on Aug. 23, 2005 in corresponding Japan Application No. 2002-577351. (1 page).

"LonWorks, Bringing the Internet to Life," Mar. 24, 2000, Issue No. 6, Echelon Japan Co., Tokyo, Japan (with partial translation).

* cited by examiner

NETWORK MANAGEMENT SYSTEM FOR REMOTE SETUP OF CONTROL EQUIPMENT IN A NETWORK

TECHNICAL FIELD

The present invention relates to a network management system for an equipment management system, a home network system, etc. which monitors and controls equipment, such as air-conditioning equipment and lighting equipment in a building or a house.

BACKGROUND ART

In a network management system which monitors and controls equipment, such as air-conditioning equipment and lighting equipment in a building or a house, setup processing an address setup, a connection setup, etc. of the equipment is conventionally performed by a specialized setup machine linked to the network or a specialized node for performing a system management.

Generally, as the network for equipment, such as air-conditioning equipment and lighting equipment, is mostly built as a closed configuration in a narrow area like a building or a house, workers need to go there each time for performing a setup of each network. Moreover, especially in facilities equipment, as many machines of the same model are often connected to the same network, the same setup processing needs to be repeatedly performed for a large number of equipment. Therefore, there is a problem that a great many man-hours are needed and setup errors may easily happen.

A conventional network management system for solving the above mentioned problem is now explained referring to FIG. 7. FIG. 7 shows the configuration of the conventional network management system disclosed in the Japanese Unexamined Patent Publication No. JP 2000-74707, as an example.

A sensor apparatus 1 connected to a network 2, such as Ethernet, can perform interactive communications with another sensor apparatus 1 connected to the same network 2 or with an upper rank host 3 composed of a personal computer etc., through the network 2. Namely, sensing information (data) for which signal processing has been done can be transmitted to the network 2, and various data and control commands can be received through the network 2. Each sensor apparatus 1 and the upper rank host 3 build a bus network, and information can be transmitted to and received from an optional party.

Besides, it is possible to set up all sensor apparatuses belonging to the same group or all sensor apparatuses which work under the same or similar environment by doing tuning processing once, and it is also possible to automatically configure all the sensor apparatuses, without having any adjustment operation and on-the-spot adjustment, at the time of exchanging the sensor apparatus or adding a new sensor apparatus. Namely, configuration data obtained by tuning up one sensor apparatus 1 (for example, sensor apparatus A) is uploaded to the upper rank host 3, and other sensor apparatuses (for example, sensor apparatuses B and C) download the configuration data which the sensor apparatus A uploaded through the network 2 and use the downloaded configuration data for their own use.

Thus, it is sufficient for other sensor apparatuses B and C only to download data in order to perform a configuration, and tuning processing such as a concrete teaching becomes unnecessary to be performed. The uploaded configuration data is stored and retained in an external storage 4 connected to the upper rank host 3.

As mentioned above, it is disclosed in the conventional art that setup processing and a setup error can be reduced by uploading setup information of equipment to the upper rank host through the network after having set up the equipment and downloading the setup information to other equipment. However, at least a basic initial processing, that is a setup of one sensor apparatus (equipment), needs to be performed at the place of the sensor apparatus.

The present invention aims to solve the above mentioned subject and problem. An object of the present invention is to obtain a network management system where setup processing of the target network can be done at other network, which enables a network setup to be performed from a remote place, and to obtain a network management system where setup information is not combined information of a setup value and setup data peculiar to a maker or a network system, which enables the network management system to flexibly respond to various networks.

DISCLOSURE OF THE INVENTION

A network management system according to the present invention includes a plurality of networks to which equipment is connected and a management node connected between the plurality of networks, for exchanging setup information on equipment between different networks through the management node.

The management node includes:

first transmission/reception means which performs data communications with one network;

second transmission/reception means which performs data communications with the other network;

setup information store means which stores setup information on the other network;

setup information frame analysis means which analyzes a setup information frame received from the above-mentioned one network and making the setup information store means store the setup information on the other network;

setup means which sets up the other network by using the setup information on the other network;

setup state acquisition means which acquires a setup state of the other network from equipment which is connected to the other network and making the setup information store means store the setup state as the setup information on the other network; and setup information frame forming means which forms a setup information frame in order to transmit the setup information on the other network to the above-mentioned one network, and transmitting to above-mentioned one network.

Further, in the network management system according to the present invention, each element which composes the setup information on a network in the setup information frame is an equipment address of the equipment linked to the system, and a connection setup between each equipment based on a correspondence between the equipment address and an equipment property number.

Moreover, in the network management system according to the present invention, the setup information frame analysis means and the setup information frame forming means include interpreting and forming means of a data structure description language which can be used for communications on a world wide web, and a communication frame based on the data structure description language is used for communications of the setup information between the plurality of networks.

BEST MODE FOR CARRYING OUT THE INVENTION

Each Embodiment of the present invention will be explained referring to the figures.

Embodiment 1

Figure 1:
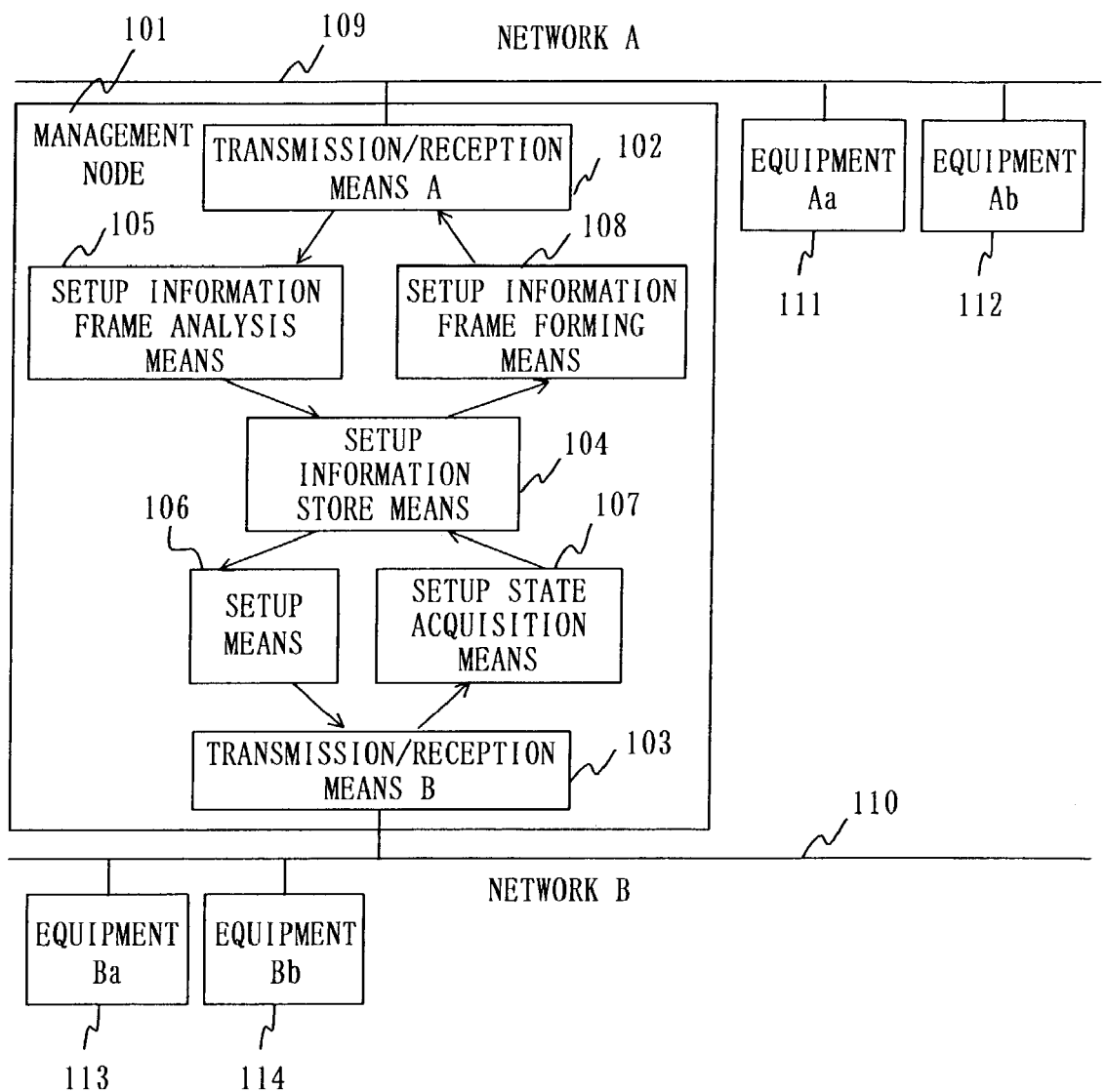
FIG. 1 shows a configuration of a network management system according to Embodiment 1 of the present invention.

The network management system according to Embodiment 1 of the present invention is explained with reference to FIGS. 1 and 2. FIG. 1 shows a configuration of the network management system according to Embodiment 1 of the present invention, and FIG. 2 shows another configuration of the network management system according to Embodiment 1 of the present invention.

Figure 2:
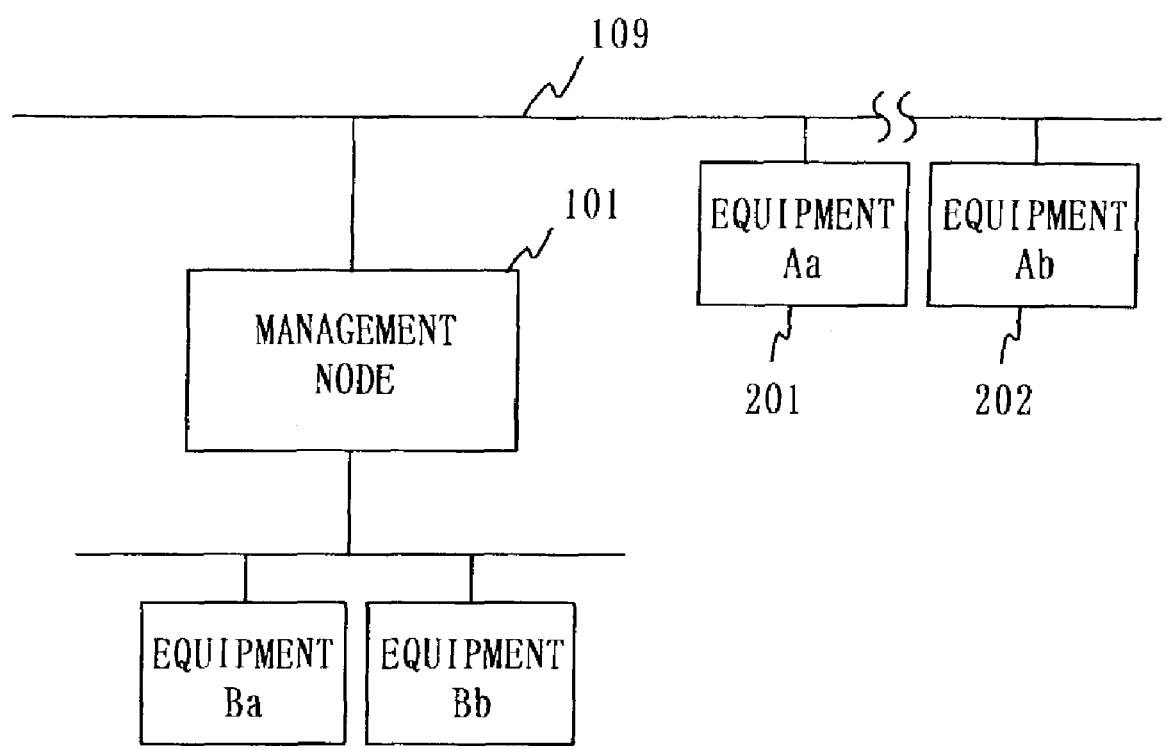
FIG. 2 shows another configuration of a network management system according to Embodiment 1 of the present invention.

In FIGS. 1 and 2, a management node 101 is composed of a transmission/reception means A 102, a transmission/reception means B 103, a setup information store means 104, a setup information frame analysis means 105, a setup means 106, a setup state acquisition means 107, and a setup information frame forming means 108.

The transmission/reception means A 102 performs data communications with a network A 109 and the transmission/reception means B 103 performs data communications with a network B 110, where the protocols of the networks A and B are different. Equipment Aa 111 and equipment Ab 112 are respectively connected to the network A 109, equipment Ba 113 and equipment Bb 114 are respectively connected to the network B 110, and equipment Aa 201 and equipment Ab 202 are respectively connected to the network A 109.

The operation of the network management system according to Embodiment 1 of the present invention will now be explained with reference to the figures.

It will be described the case that the management node 101 is connected between the network A 109 and the network B 110, and a setup of the network B 110 is performed by the equipment Aa 111 connected to the network A 109.

First, the equipment Aa 111 transmits setup information on the network B 110 to the network A 109 as a setup information frame. The transmission/reception means A 102 of the management node 101 receives the setup information frame and sends it to the setup information frame analysis means 105. The setup information frame analysis means 105 interprets and extracts the setup information out of the communication frame and makes the setup information store means 104 store the setup information. When a command to start a setup is contained in the setup information received from the equipment Aa 111, the setup means 106 receives the setup information accumulated in the setup information store means 104, and transmits the setup information to the equipment Ba 113 and the equipment Bb 114 which are connected to the network B 110 through the transmission/reception means B 103 in order to perform a setup. Thus, the setup of the network B 110 is performed at the network A 109.

Then, the case of the equipment Aa 111 connected to the network A 109 acquiring a setup state of the network B 110 is explained. First, the setup state acquisition means 107 reads the setup information of the equipment Ba 113 and the equipment Bb 114 connected to the network B 110 through the transmission/reception means B 103. The read setup information is stored in the setup information store means 104. The setup information frame forming means 108 reads the setup information from the setup information store means 104, forms the setup information into the form of the communication frame which can be transmitted by the network A 109, and transmits the setup information to the network A 109 through the transmission/reception means A 102. Then, it becomes possible to know the setup state of the network B 110 at the network A 109 side when the transmitted setup information is received by the equipment Aa 111, for instance. Thereby, the setup processing of the network B 110 can be performed at the network A 109 side with checking the setup state of the network B 110 side.

Furthermore, as the setup processing can be performed with checking the current setup state one by one, it is possible to perform a consistent setup processing without being mutually contradictory, not only in the configuration as shown in FIG. 1 but also in the configuration where the apparatuses performing a setup exist simultaneously at two or more places, being away from each other, like the equipment Aa 201 and the equipment Ab 202 as shown in FIG. 2.

Each element composing setup information on a network in a setup information frame is an equipment address of the equipment linked to the system and a connection setup between each equipment based on a correspondence between the equipment address and an equipment property number. The element composing setup information is independent from a correspondence between the equipment property and its value and the network command. The element composing setup information is independent from a data structure definition used in the system. By dint of this, it is unnecessary to use a setup value and setup data peculiar to a maker or a network system, which enables the network management system to flexibly respond to various networks.

As mentioned above, since it becomes possible to set up or acquire the setup information of the network B 110 at equipment connected to the network A 109 side, setup processing of the network B 110 to which equipment is connected can be performed by the network A 109 built in the place away from the network B 110. Therefore, man-hours necessary for setup processing of the network for equipment, such as air-conditioning equipment and lighting equipment, can be reduced and the engineering cost can be cut down.

Since the type of each network is not specifically limited, it is possible to use a network which can be used in a wide area, such as the Internet/intranet on the network A 109 side, and it is also possible to perform the setup processing of the network B 110 from a remote place, without need of a man for the setup going to the spot. Regarding this, it will be explained in detail in the following Embodiment 2.

Embodiment 2

Figure 3:
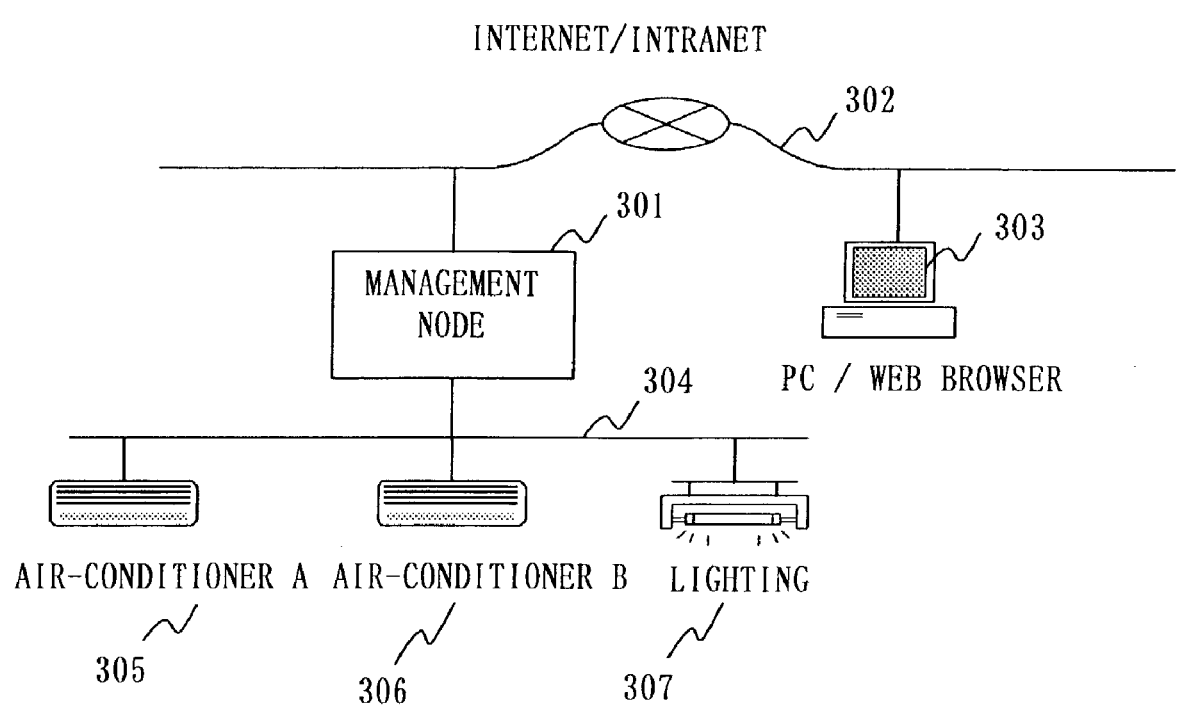
FIG. 3 shows a configuration of a network management system according to Embodiment 2 of the present invention.

The network management system according to Embodiment 2 of the present invention will now be explained referring to FIG. 3. FIG. 3 shows a configuration of the network management system according to Embodiment 2 of the present invention.

In FIG. 3, although the internal configuration of a management node 301 is not illustrated, the configuration of the management node 301 is the same as that of the management node 101 of Embodiment 1. Interpreting and forming means of a data structure description language of XML (eXtensible Markup Language) is installed in the setup information frame analysis means 105 and the setup information frame forming means 108. The Internet/intranet is used, as a wide area network, for a network A 302, and a personal computer (hereinafter, called a personal computer) 303 is connected to the network A 302. This personal computer 303 has Web browser software (Internet/intranet reading means). Air-conditioning equipment and lighting equipment, such as an air-conditioner A 305, an air-conditioner B 306, and a lighting 307, are connected to a network B.

Next, the operation of the network management system according to Embodiment 2 of the present invention will be explained with reference to the figures.

It will be described the case that the management node 301 is connected between the network A 302 and the network B 304, and a setup of the network B 304 is performed by the personal computer 303 connected to the network A 302.

First, the personal computer 303 transmits setup information on the network B 304 to the network 302 as a setup information frame. For the setup information frame, a data structure description language, such as XML (eXtensible Markup Language), which can be dealt with in general WEB browsers is used in the setup data transmission at the Internet/intranet of the network A 302.

The transmission/reception means A 102 of the management node 301 receives the setup information frame and sends it to the setup information frame analysis means 105. The setup information frame analysis means 105 interprets and extracts the setup information using XML out of the communication frame and makes the setup information store means 104 store the setup information. When a command to start a setup is contained in the setup information received from the personal computer 303, the setup means 106 receives the setup information accumulated in the setup information store means 104, and transmits the setup information to the air-conditioner A 305, the air-conditioner B 306 and the lighting 307 which are connected to the network B 304 through the transmission/reception means B 103 in order to perform a setup. Thus, the setup of the network B 304 is performed at the network A 302.

Then, the case of the personal computer 303 connected to the network A 302 acquiring a setup state of the network B 304 will be explained. First, the setup state acquisition means 107 reads the setup information of the air-conditioner A 305, the air-conditioner B 306 and the lighting 307 connected to the network B 110 through the transmission/reception means B 103. The read setup information is stored in the setup information store means 104. The setup information frame forming means 108 reads the setup information from the setup information store means 104, forms the setup information into the form of the communication frame based on XML which can be transmitted by the network A 302, and transmits the setup information to the network A 302 through the transmission/reception means A 102. Then, it becomes possible to know the setup state of the network B 304 at the network A 302 side when the transmitted setup information is received by the personal computer 303. Thereby, the setup processing of the network B 303 can be performed at the network A 302 side with checking the setup state of the network B 303 side.

As mentioned above, a setup processing for a network of equipment and controlling/monitoring the equipment can be performed by utilizing a general-purpose personal computer and Web browser software, without newly producing a special tool. In XML, it is possible to express both the structure of the whole data and values of data, so that the setup information on a network can be easily expressed.

Furthermore, the management node 301 can be easily adjusted by simple means of installing interpreting and forming means of XML in the setup information frame analysis means 105 and the setup information frame forming means 108 which are included in the management node 301.

Embodiment 3

Figure 4:
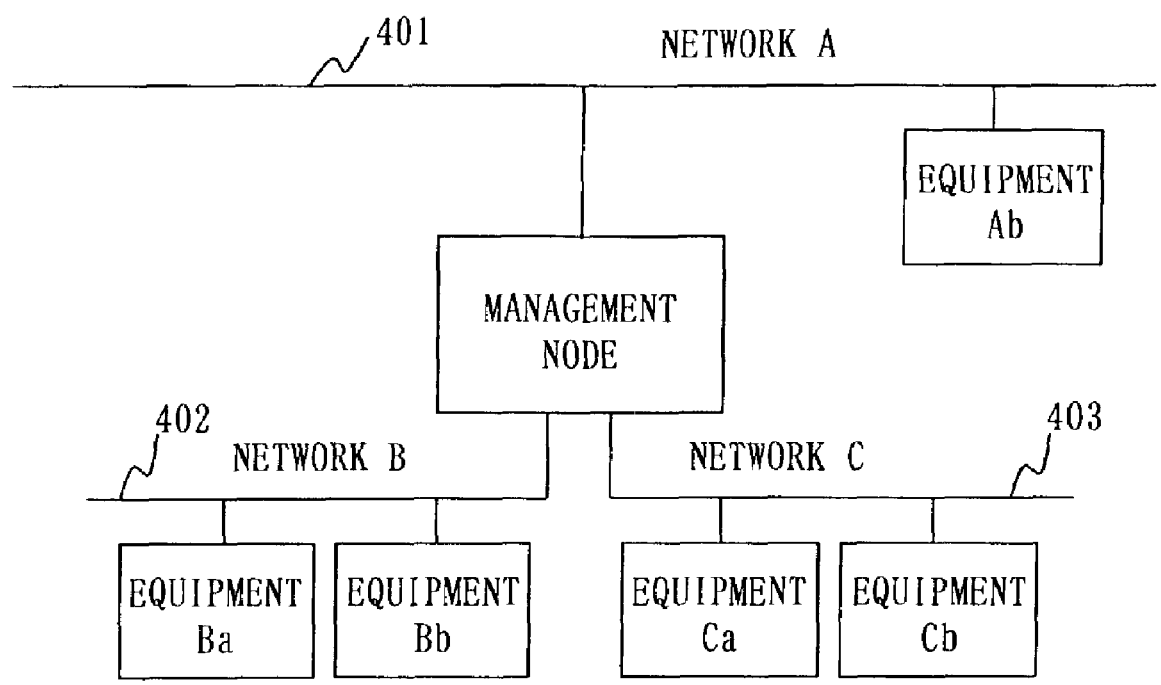
FIG. 4 shows a configuration of a network management system according to Embodiment 3 of the present invention.

The network management system according to Embodiment 3 of the present invention will be explained referring to FIGS. 4, 5 and 6. FIG. 4 shows a configuration of the network management system according to Embodiment 3 of the present invention, FIG. 5 shows another configuration of the network management system according to Embodiment 3 of the present invention, and FIG. 6 shows another configuration of the network management system according to Embodiment 3 of the present invention.

In FIG. 4, each equipment is respectively connected to a network A 401, a network B 402 and a network C 403. In FIG. 4, the side of performing a setup is one network: the network A 401, and the sides of being performed a setup are plurality of networks: the network B 402 and the network C 403. Setup information is exchanged between the network A 401 and the network B 402, and between the network A 401 and the network C 403. The setup processing is carried out in the same way as the above-mentioned Embodiment 1 or 2.

Figure 5:
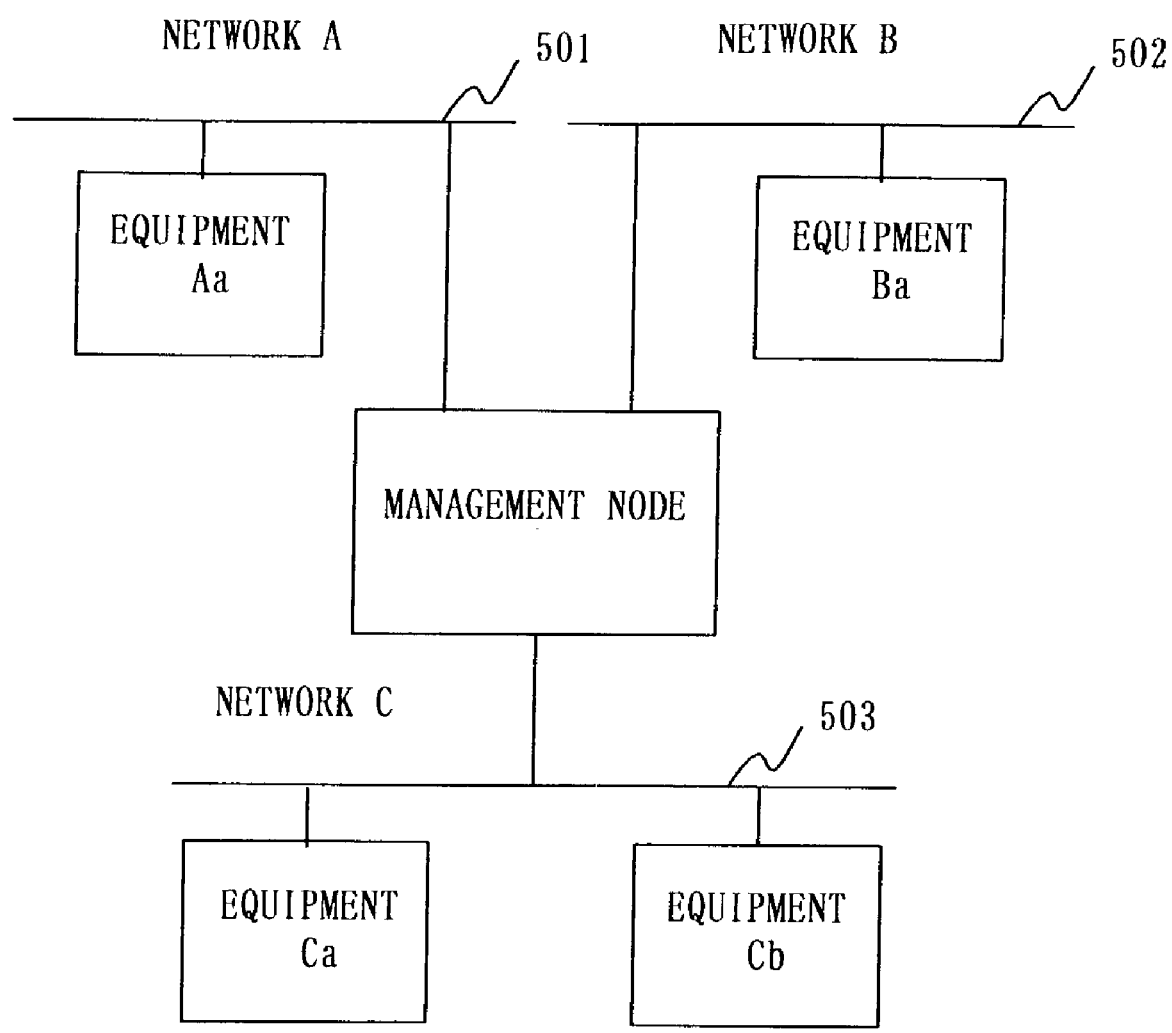
FIG. 5 shows another configuration of a network management system according to Embodiment 3 of the present invention.

In FIG. 5, each equipment is respectively connected to a network A 501, network B 502 and a network C 503. In FIG. 5, the sides of performing a setup are plurality of networks: the network A 501 and the network B 502, and the side of being performed a setup is one network: the network C 503. Setup information is exchanged between the network A 401 and the network C 503, and between the network B 502 and the network C 503. The setup processing is carried out in the same way as the above-mentioned Embodiment 1 or 2.

Figure 6:
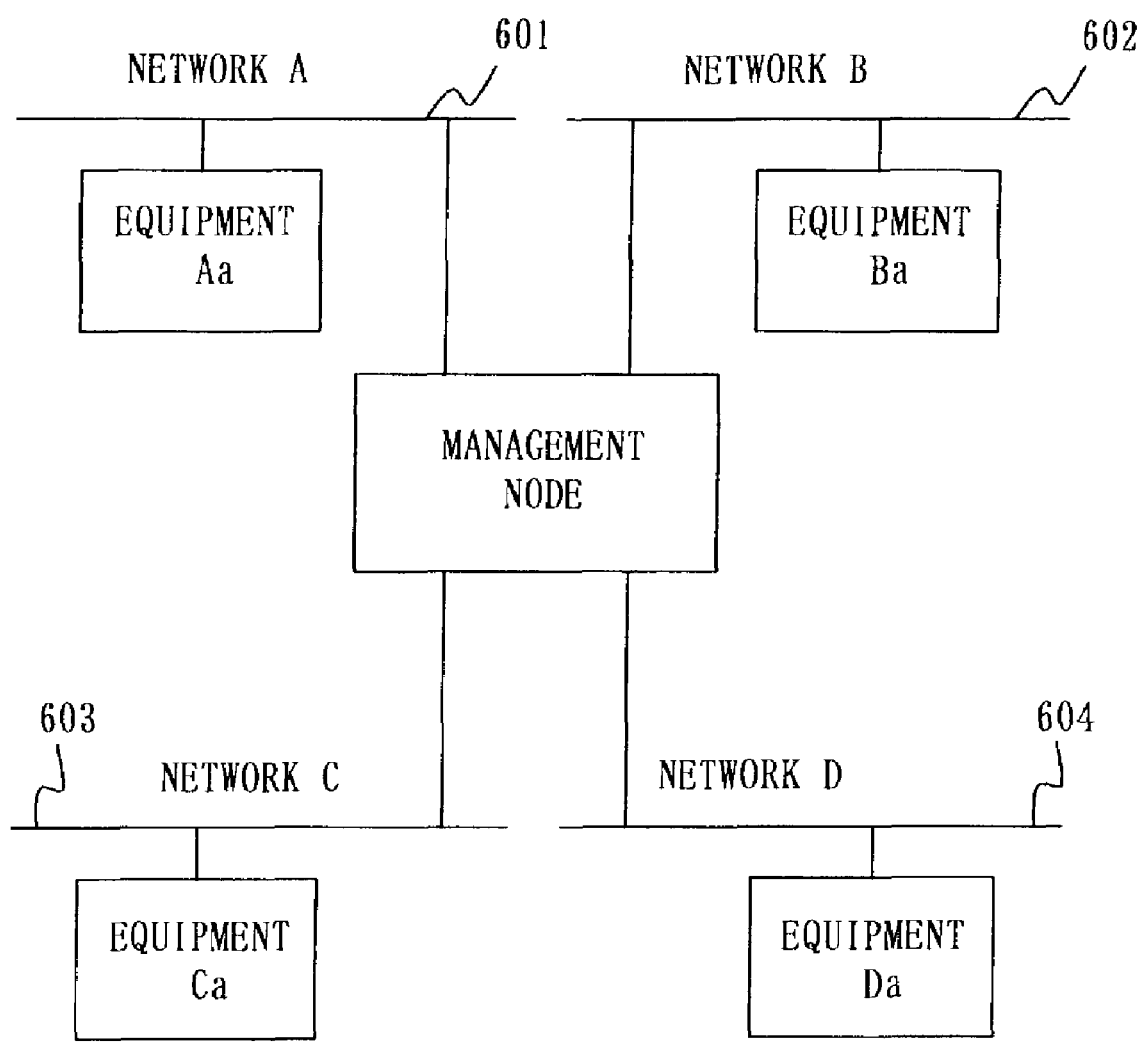
FIG. 6 shows another configuration of a network management system according to Embodiment 3 of the present invention.
Figure 7:
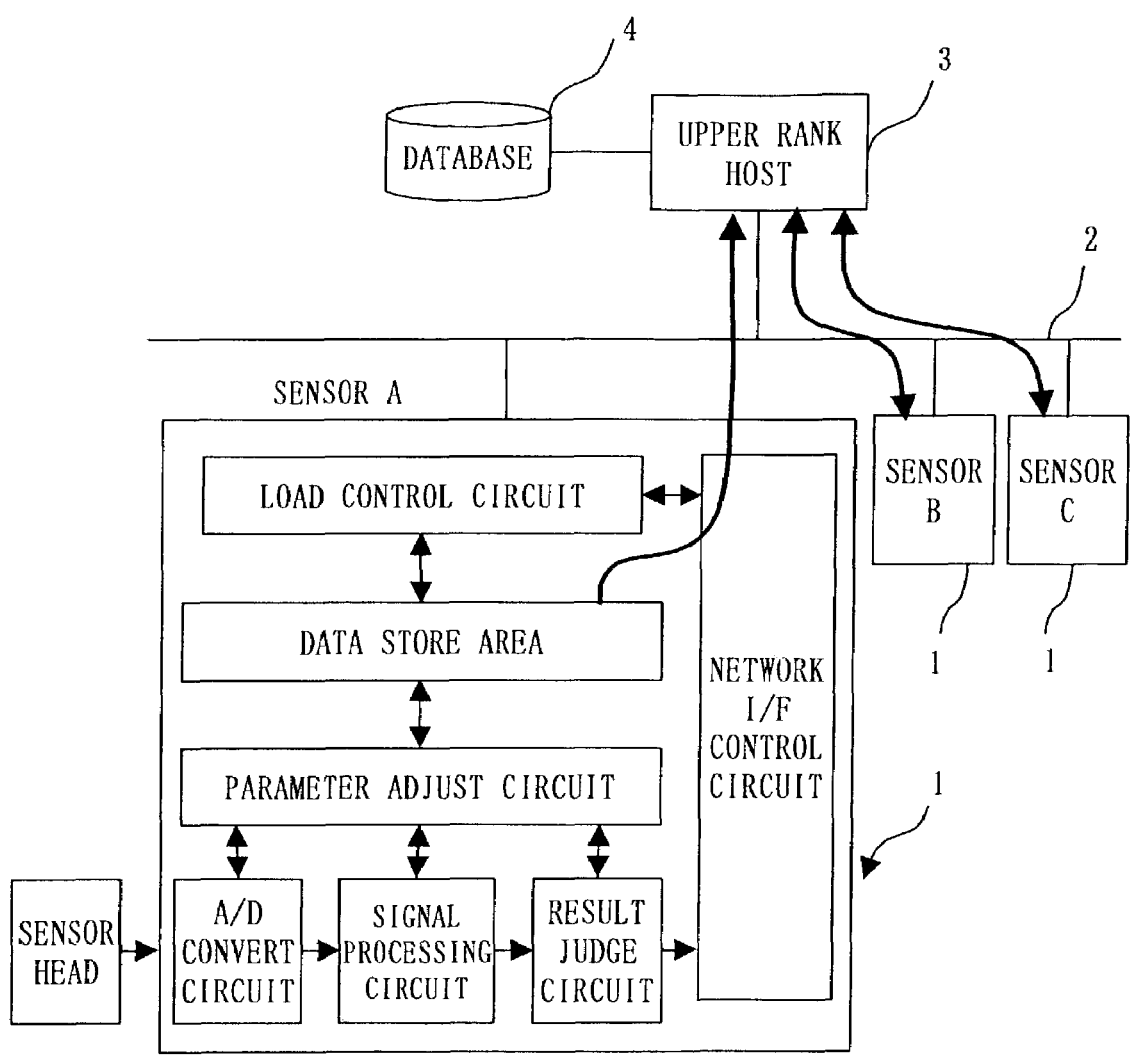
FIG. 7 shows a configuration of a conventional network management system.

In FIG. 6, each equipment is respectively connected to a network A 601, a network B 602, a network C 603, and a network D 604. In FIG. 6, the sides of performing a setup are plurality of networks and the sides of being performed a setup are also plurality of networks. Setup information is exchanged between the networks A 601 and B 602 and the networks C 603 and D 604. The setup processing is carried out in the same way as the above-mentioned Embodiment 1 or 2.

In addition, although the explanation of Embodiments 1 through 3 is described on the supposition that each network has a different protocol, it is also acceptable that all the protocols of all the networks are the same ones.

INDUSTRIAL APPLICABILITY

As mentioned above, the network management system according to the present invention includes a plurality of networks to which equipment is connected and a management node connected between the plurality of networks, for exchanging setup information on equipment between different networks through the management node.

The management node includes: first transmission/reception means which performs data communications with one network, second transmission/reception means which performs data communications with another network, setup information store means which stores setup information on the above-mentioned another network, setup information frame analysis means which analyzes a setup information frame received from the above-mentioned one network and making the setup information store means store the setup information on the above-mentioned another network, setup means which sets up the above-mentioned another network by using the setup information on the above-mentioned another network, setup state acquisition means which acquires a setup state of the above-mentioned another network from equipment which is connected to the above-mentioned another network, and making the setup information store means store the setup state as the setup information on the above-mentioned another network, and setup information frame forming means which forms a setup information frame in order to transmit the setup information on the above-mentioned another network to the above-mentioned one network, and transmitting to above-mentioned one network. Thus, setup processing of a target network can be performed at other network. As a man for the setup does not need to go to the spot at every setup processing time, man-hours necessary for the setup processing can be reduced and the engineering cost can be cut down.

Further as mentioned above, in the network management system according to the present invention, each element which composes the setup information on a network in the setup information frame is an equipment address of the equipment linked to the system, and a connection setup between each equipment based on a correspondence between the equipment address and an equipment property number. Thus, as the setup information does not utilize a combination of a setup value and setup data peculiar to a maker or a network system, it is possible to flexibly respond to various networks.

Moreover as mentioned above, in the network management system according to the present invention, the setup information frame analysis means and the setup information frame forming means include interpreting and forming means of a data structure description language which can be used for communications on a world wide web, and a communication frame based on the data structure description language is used for communications of the setup information between the plurality of networks. Thus, a setup processing of equipment for a network and controlling/monitoring the equipment can be performed by utilizing a general-purpose personal computer and Web browser software, without newly producing a special tool.

The invention claimed is:

1. A network management system which includes a plurality of networks to which equipment is connected and a management node connected between the plurality of networks, for exchanging setup information on equipment between different networks through the management node, wherein the management node comprises:

first transmission/reception means which performs data communications with one network;

second transmission/reception means which performs data communications with another network;

setup information store means which stores setup information for the another network;

setup information frame analysis means which analyzes a setup information frame received from the one network, the setup information frame containing the setup information for the another network, and making the setup information store means store the setup information;

setup means which sets up the another network by using the setup information for the another network which is stored in the setup information store means and received from the one network;

setup state acquisition means which acquires a setup state of the another network from equipment which is connected to the another network, and making the setup information store means store the acquired setup state as the setup information about the another network; and setup information frame forming means which forms a setup information frame in order to transmit the setup information about the another network to the one network, and transmitting the same to the one network, wherein setup and checking of the another network is performed by equipment connected to the one network.

2. The network management system of claim 1, wherein each element which composes the setup information on a network in the setup information frame is an equipment address of the equipment linked to the system, and a connection setup between each equipment based on a correspondence between the equipment address and an equipment property number.

3. The network management system of claim 1,
wherein the setup information frame analysis means and the setup information frame forming means include interpreting and forming means of a data structure description language which can be used for communications on a world wide web, and
wherein a communication frame based on the data structure description language is used for communications of the setup information between the plurality of networks.

4. The network management system of claim 2,
wherein the setup information frame analysis means and the setup information frame forming means include interpreting and forming means of a data structure description language which can be used for communications on a world wide web, and
wherein a communication frame based on the data structure description language is used for communications of the setup information between the plurality of networks.

5. A network management system which includes a management node connected between a plurality of networks to which equipment is connected, for exchanging setup information on equipment between different networks through the management node, wherein the management node comprises:

first transmission/reception means which performs data communications with one network;

second transmission/reception means which performs data communications with another network;

setup information store means which stores connection setup information between equipment connected to the another network;

setup information frame analysis means which analyzes a setup information frame received from the one network, the setup information frame containing the connection setup information between equipment connected to the another network and makes the setup information store means store the connection setup information; and setup means which sets up the another network by using the connection setup information between equipment connected to the another network which is stored in the setup information store means and received from the one network, wherein setup of the another network is performed by equipment connected to the one network;

wherein the another network connects at least first equipment with second equipment, the first equipment and the second equipment each having an equipment property;

wherein the setup information store means stores information, which relates an equipment address of the first equipment and an equipment property number indicating the equipment property of the first equipment, to an equipment address of the second equipment and an equipment property number indicating the equipment property of the second equipment, as connection setup information between equipment of the first equipment and the second equipment;

and wherein the setup means sets up the connection setup information between equipment stored in the setup information store means at least for the first equipment and the second equipment of the another network, and relates equipment properties between the first equipment and the second equipment.

6. A network management system which includes a management node connected between a plurality of networks to which equipment is connected, for exchanging setup information on equipment between different networks through the management node, wherein the management node comprises:

first transmission/reception means which performs data communications with one network;

second transmission/reception means which performs data communications with another network;

setup information store means which stores connection setup information between equipment connected to the another network;

setup state acquisition means which acquires the connection setup information between equipment connected to the another network from equipment connected to the another network, and which makes the setup information store means store the acquired connection setup information between equipment;

set information frame forming means which forms a setup information frame in order to transmit the connection setup information between equipment of the another network, which is stored in the setup information store means, to the one network, and transmits the setup information frame to the one network wherein the one network checks the setup on the equipment connected to the another network, wherein the another network connects at least first equipment with second equipment, the first equipment and the second equipment each having an equipment property; and wherein the setup state acquisition means acquires information that relates an equipment address of the first equipment and an equipment property number indicating the equipment property of the first equipment, to an equipment address of the second equipment and an equipment property number indicating the equipment property of the second equipment, and makes the setup information store means store the information.

7. A network management system which includes a management node connected between a plurality of networks to which equipment is connected, for exchanging setup information on equipment between different networks through the management node, wherein the management node comprises:

first transmission/reception means which performs data communication with one network;

second transmission/reception means which performs data communication with another network;

setup information store means which stores connection setup information between equipment connected to the another network;

setup information frame analysis means which analyzes a setup information frame received from the one network, the setup information frame containing the setup information for the another network, and makes the setup information store means store connection setup information between equipment connected to the another network;

setup means which sets up a connection of equipment of the another network by using the connection setup information between equipment connected to the another network which is stored in the setup information store means and received from the one network;

setup state acquisition means which acquires the connection setup information between equipment of the another network from equipment connected to the another network, and which makes the setup information store means store the acquired connection setup information between the equipment connected to the another network; and set information frame forming means which forms a setup information frame in order to transmit the connection setup information between the equipment of the another network, which is stored in the setup information store means, to the one network, and transmits the setup information frame to the one network, wherein the setup and checking of the another network is performed by equipment connected to the one network, wherein each equipment of at least first equipment and second equipment, to which the another network connects, has an equipment property, wherein the setup information store means stores information which relates an equipment address of the first equipment and an equipment property number indicating the equipment property of the first equipment, to an equipment address of the second equipment and an equipment property number indicating the equipment property of the second equipment, as connection setup information between equipment of the first equipment and the second equipment;

wherein the setup means sets up the connection setup information between equipment, which is stored in the setup information store means at least for two equipments of the first equipment and the second equipment of the another network, and relates equipment properties between equipment;

wherein the setup state acquisition means acquires information that relates the equipment address of the first equipment and the equipment property number indicating the equipment property of the first equipment, to the equipment address of the second equipment and the equipment property number indicating the equipment property of the second equipment, as connection setup information between the first equipment and the second equipment connected to the another network, and makes the setup information store means store the information.

8. The network management system according to claim 6, wherein equipment connected to the one network displays a connection setup state between equipment of the another network to a user based on the connection setup information between equipment of the another network, which is transmitted from the setup information frame forming means to the one network, and promotes a change of the connection setup information between network of the another network, wherein the first transmission/reception means receives a setup information frame in order to change the connection setup information between equipment of the another network, from the equipment connected to the one network, and wherein the management node further comprises:

setup information frame analysis means which analyzes a setup information frame for changing the connection setup information between equipment of the another network, which is received by the first transmission/reception means, and changes the connection setup information between equipment connected to the another network, which is stored in the setup information store means; and setup means which changes a connection setup between equipment of the network by using the connection setup information between equipment connected to the network, which is stored in the setup information store means and is changed by the setup information frame analysis means.

9. The network management system according to claim 5, wherein the setup information frame analysis means includes interpreting and forming means of a data structure description language which can be used for communications on a world wide web, and wherein a communication frame based on the data structure description language is used for communications of the setup information between the plurality of networks.

10. The network management system according to claim 7, wherein equipment connected to the one network displays a connection setup state between equipment of the another network to a user based on the connection setup information between equipment of the another network, which is transmitted from the setup information frame forming means to the one network, and promotes a change of the connection setup information between network of the another network, wherein the first transmission/reception means receives a setup information frame in order to change the connection setup information between equipment of the another network, from the equipment connected to the one network, and wherein the management node further comprises:

setup information frame analysis means which analyzes a setup information frame for changing the connection setup information between equipment of the another network, which is received by the first transmission/reception means, and changes the connection setup information between equipment connected to the another network, which is stored in the setup information store means; and setup means which changes a connection setup between equipment of the network by using the connection setup information between equipment connected to the network, which is stored in the setup information store means and is changed by the setup information frame analysis means.

11. The network management system according to claim 6, wherein the setup information frame analysis means includes interpreting and forming means of a data structure description language which can be used for communications on a world wide web, and wherein a communication frame based on the data structure description language is used for communications of the setup information between the plurality of networks.

12. The network management system according to claim 7, wherein the setup information frame analysis means includes interpreting and forming means of a data structure description language which can be used for communications on a world wide web, and wherein a communication frame based on the data structure description language is used for communications of the setup information between the plurality of networks.

* * * * *